Sept. 20, 1927.
M. R. SHIPLEY
1,642,973
STOP COCK HAVING FLOATING PLUG
Filed May 24, 1926
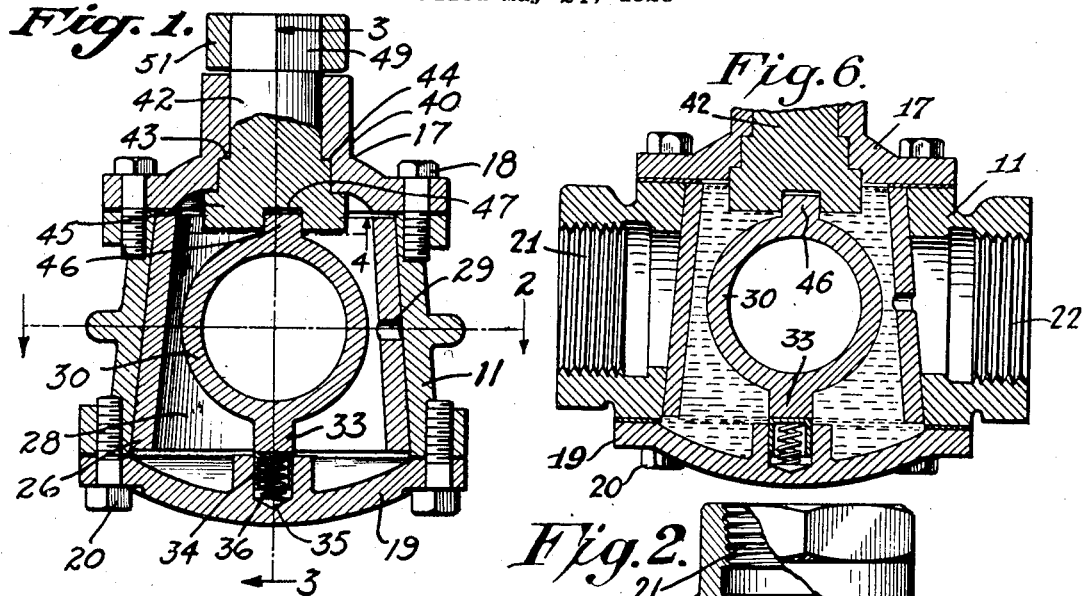
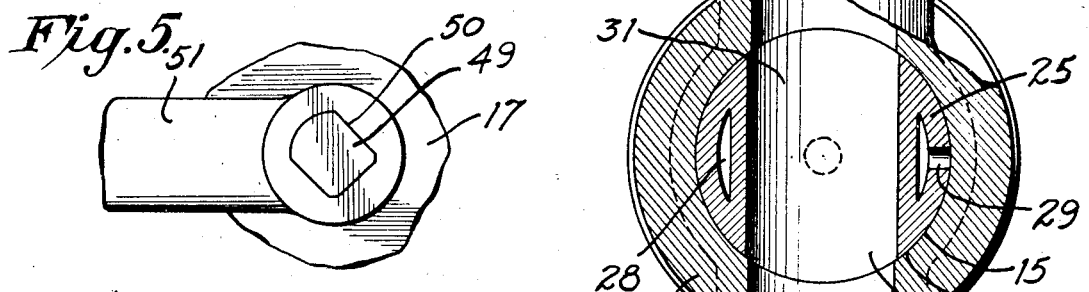
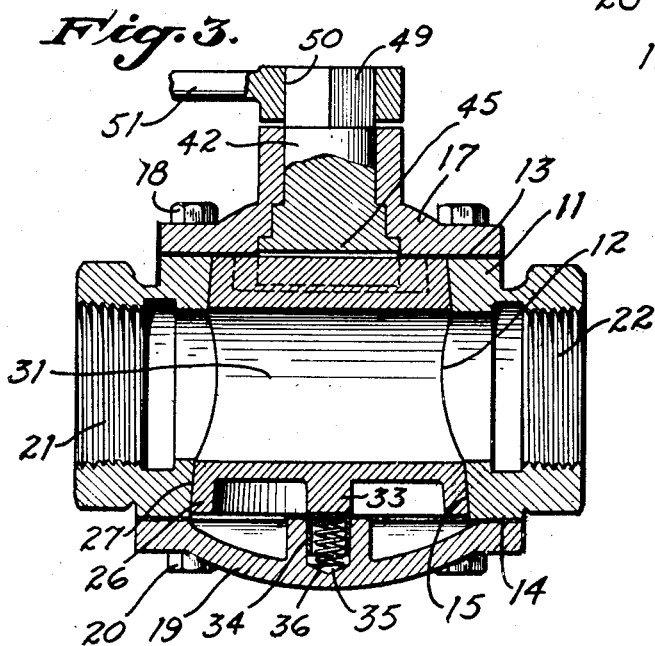
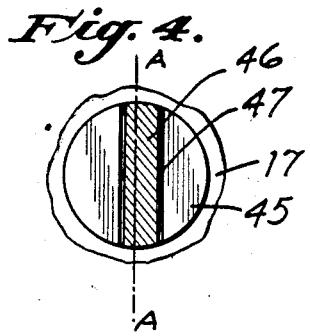
INVENTOR:
MARION R. SHIPLEY,
BY
ATTORNEY.

Patented Sept. 20, 1927.

1,642,973

UNITED STATES PATENT OFFICE.

MARION R. SHIPLEY, OF MANHATTAN BEACH, CALIFORNIA, ASSIGNOR, BY MESNE ASSIGNMENTS, TO OIL APPLIANCE MANUFACTURING CORPORATION, OF LOS ANGELES, CALIFORNIA, A CORPORATION OF CALIFORNIA.

STOPCOCK HAVING FLOATING PLUG.

Application filed May 24, 1926. Serial No. 111,203.

This invention relates to stop cocks. The ordinary form of stop cock consists of a body having a cavity in which a frusto-conical plug is placed, this plug engaging a frusto-conical seat which surrounds the cavity. Formed in the body and connected to the cavity are inlet and outlet passages which are connected together by a plug passage when the plug is in open position.

It is an object of this invention to provide a stop cock in which the pressure of the fluid being conducted through the stop cock is supplied to the interior of the plug so that the plug is substantially floating, but is firmly seated by a separate seating means.

In my invention I provide a plug construction which has a shell which is open at opposite ends. Extended across the shell is a tube which is preferably cylindrical, this tube forming a conduit for the fluid and serving to reinforce the shell. The shell is provided with an opening which connects the interior thereof with the inlet passage of the valve body when the plug is in closed position.

It is accordingly an object of this invention to provide a stop cock having a novel form of floating plug which is adequately reinforced.

When the stop cock is used on lines handling viscous fluids, syrup, for example, it is advisable to fill the interior of the shell of the plug with a pressure transmitting-substance so that the viscous fluid being conducted through the stop cock will not pass to the interior of the plug. This is desirable since the viscous fluid would collect in the interior of the plug, making the stop cock difficult to clean. The pressure-transmitting substance may be any substance which is capable of transmitting pressure such as a jelly-like substance.

It is accordingly an object of this invention to provide a stop cock in which the interior of the plug is supplied with a pressure-transmitting substance.

In the stop cock of my invention when the plug is in closed position the opening which connects to the interior thereof must communicate with the pressure passage of the body so that the fluid pressure will be transmitted to the interior of the plug. The valve of my invention has a separate stem by means of which the plug is rotated. It is therefore essential that these parts be assembled in a certain manner so that when the stop cock is shut off the plug will be turned into proper closed position.

It is accordingly an object of this invention to provide a means which insures a proper assembling of the plug and stem parts thereof.

Other objects and advantages of the invention will be made manifest hereinafter.

Referring to the drawing which is for illustrative purposes only,

Fig. 1 is a vertical section through a stop cock embodying the features of my invention.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Fig. 5 is a fragmentary plan view of Fig. 3.

Fig. 6 is a view similar to Fig. 3 showing a valve plug in closed position and floating in a pressure transmitting substance.

Referring to the drawing, the numeral 11 represents a stop cock body having a central cavity 12 which connects to upper and lower faces 13 and 14. The cavity 12 provides a frusto-conical seat 15. The upper and smaller end of the cavity 12 is closed by a cover 17 which is secured in place by cap screws 18, and the lower and larger end of the cavity is closed by a plate 19 which is secured in place by cap screws 20. Connected to the cavity 12 is an inlet passage 21 and an outlet passage 22.

Placed in the cavity 12 is a plug 25. The plug 25 has a frusto-conical shell 26 which provides an outer frusto-conical seat 27 adapted to engage the frusto-conical seat 15. The shell 26 is open at both ends and the interior thereof provides a balance chamber 28. A duct 29 connects the balance chamber 28 with the exterior of the plug. The plug 25 also has a tube 30 which is preferably cylindrical which extends across the balance chamber 28. The tube 30 is formed integrally with the shell 26. When the plug 25 is in open position, as shown in the drawing, a passage 31 provided by the tube 30 connects the inlet and outlet passages 21 and 22 of the body 11 together. Extending downward from the lower part of the tube 30 is a projection 33 which is engaged by the bottom of a thimble 34. The thimble 34 extends into a cavity 35 provided by the plate 19. Within the thimble 34 and the cavity 35 is a spring 36 which is compressed and which exerts a pressure against the projection 33 so as to force the plug 25 upward so that the frusto-conical face 27 engages the frusto-conical seat 15, thus providing a tight seal.

The cover 17 has a cylindrical extension 40 having an opening 41 through which a stem 42 extends. The stem 42 has a seat 43 adapted to engage a face 44 of the cover 17. The inner end of the stem 42 is provided in the form of a head 45 which rests in the cavity 12 and partly in the balance chamber 28. The plug 25 has an upwardly extending engageable member in the form of a tongue 46. Referring to Fig. 4, the tongue 46 is offset from the line A—A which extends through the axis of rotation of the plug 25. The head 45 of the stem 42 is provided with a groove 47, into which the tongue 46 extends. This groove 47 is offset as shown so as to correspond to the tongue 46. The upper end of the stem 42 is provided with an irregular shaped wrench-receiving portion 49, which is adapted to extend into an opening 50 of a wrench 51. The shape of the portion 49 is such that the wrench can only be installed thereon in a certain position. This is also true with respect to the tongue and groove arrangement of the plug and stem; that is, they can only be assembled in certain relative positions. In the drawing the plug 25 is shown in open position, the plug passage 31 connecting the inlet and outlet passages 21 and 22 together. When in closed position the plug 25 is rotated ninety degrees and is rotated in such a direction that the duct 29 connects the inlet or pressure passage to the balance chamber 28. This is very important so that the fluid pressure will be transferred to the interior of the plug so that it will be floating. In some cases where heavy or viscous fluids are handled, it is desirable to fill the balance chamber 28 as shown in Fig. 6 with a pressure-transmitting substance 29 which is preferably of a jelly-like consistency. This pressure-transmitting substance will permit the pressure of the fluid to be transferred to the interior of the plug 25, rendering it a floating plug, but will prevent the fluid from passing into the balance chamber. The pressure in the balance chamber 28 is equal in all directions and therefore, as will be readily obvious from the drawing, the plug 25 will be substantially floating. The spring 36, however, exerts an upward pressure on the plug 25 and will cause the frusto-conical face 27 to firmly engage the frusto-conical seat 15. It will be recognized that the pressure of the spring against the plug 25 is the same at all times, regardless of the pressure of the fluid being conducted through the valve, because of the fact that the fluid pressure is communicated to the interior of the plug in such a manner that it is floating and therefore the fluid pressure will have no effect of seating or removing the plug from its seat.

The construction of the plug is a very important part of this invention. The provision of the shell 26 and tube 30 is very important. The tube 30 provides a conduit through the plug for conducting the fluid and it serves as a means for reinforcing the shell 26. For this reason the shell 26 may be made comparatively thin. The plug passage 31 is cylindrical, as shown, and is slightly larger than the inlet and outlet passages 22; therefore, when the stop cock is open the passages therethrough will be unobstructible, which is very desirable. The stop cock is extremely easy to clean. In some industries the law requires that the pipe lines be cleaned at certain intervals. The ordinary form of valve makes it very difficult to clean these lines, in most cases requiring that the valve be completely dismantled. In my invention this is not necessary. When it is desired to clean the valve, the plug 25 is turned into open position and a clear passage is provided therethrough, through which a swab or other cleaning device may be passed in order to thoroughly clean the pipe line in which the stop cock is included and the passages 21, 22 and 31 of the stop cock itself.

The stop cock of my invention is especially valuable in the oil-producing industry in which a casing is extended into a well, the upper end of this casing being provided with a valve or stop cock. It is necessary at certain times to bail sand from the well, which is accomplished by means of a bailer which has to be dropped through the casing. With the ordinary form of valve, this valve must be removed for bailing. When the stop cock of my invention is used, however, it is not necessary to remove it, it being only necessary to turn the plug 25 into open position which gives an unobstructed passage through the stop cock which is as large as the passage through the casing itself.

The feature of providing a full-floating plug is very important to the invention. In the ordinary form of stop cock the fluid pressure affects the seating of the plug, either tending to seat it too tightly so as to bind it or to force it away from the seat, causing leakage. In my invention the plug is floating at all times and the fluid pressure in no way affects its position. The plug is, however, seated by the action of the spring 36 which exerts the same pressure on the plug at all times; therefore, it will be seen that the stop cock of this invention may be used regardless of the pressure of the fluid which is conducted therethrough.

The feature of forming the plug 25, the stem 42 and the handle 51 so that they can be assembled only in certain relative positions, is important to the invention, since when the plug is in closed position it must be in such a position that the duct 29 communicates with the pressure passage of the body. This is very essential in some uses of the stop cock; for example, in the oil-producing industry the slush pumps employed for pumping slush into the well are connected to a single pipe line, and the slush may be pumped therethrough in either direction. When the stop cock of my invention is used on this pipe line connected to the slush pump, it is necessary when the valve is closed to have the duct communicating with the pressure passage of the stop cock body. When one slush pump is in operation, the plug must be in one position when closed, and when the other slush pump is in operation, the plug must be in another position. The parts are so arranged that the handle 51, when the plug 25 is in closed position, is extended towards the pressure side. If the plug 25, the stem 42 and the handle 51, could be assembled in other than the proper manner, it would be impossible to discern which direction the handle was to extend when the plug is removed to closed position.

I claim as my invention:

1. A stop cock comprising: a body having an inlet passage, an outlet passage, and a closed cavity between said inlet and outlet passages, said closed cavity being surrounded by a frusto-conical seat; a plug disposed in said closed cavity, said plug having a shell adapted to engage said frusto-conical seat, said shell being open at the ends, and a tube extending through a balance chamber formed by said shell, said tube having a plug passage connecting said inlet and outlet passages together when said plug is in open position, there being a duct in said shell for connecting said balance chamber to said inlet passage when said plug is in closed position; a pressure-transmitting substance substantially filling said balance chamber; and means for rotating said plug.

2. A stop cock comprising: a body having an inlet passage, an outlet passage, and a closed cavity between said inlet and outlet passages, said closed cavity being surrounded by a frusto-conical seat; a plug disposed in said closed cavity, said plug having a shell adapted to engage said frusto-conical seat, said shell being open at the ends, and a tube extending through a balance chamber formed by said shell, said tube having a plug passage connecting said inlet and outlet passages together when said plug is in open position, there being a duct in said shell for connecting said balance chamber to said inlet passage when the plug is in closed position; resilient means for forcing said plug against said frusto-conical seat; pressure transmitting substance substantially filling said balance chamber; and means for rotating said plug.

In testimony whereof, I have hereunto set my hand at Los Angeles, California, this 18th day of May, 1926.

MARION R. SHIPLEY.